Jan. 1, 1963

J. B. BEAMAN ETAL 3,071,387

OUTBOARD MOTOR CARRIER

Filed Sept. 23, 1959

INVENTORS
John B. Beaman
BY Vivian S. Ott

Shoemaker & Mattare
ATTORNEYS

Jan. 1, 1963   J. B. BEAMAN ETAL   3,071,387
OUTBOARD MOTOR CARRIER
Filed Sept. 23, 1959   2 Sheets-Sheet 2
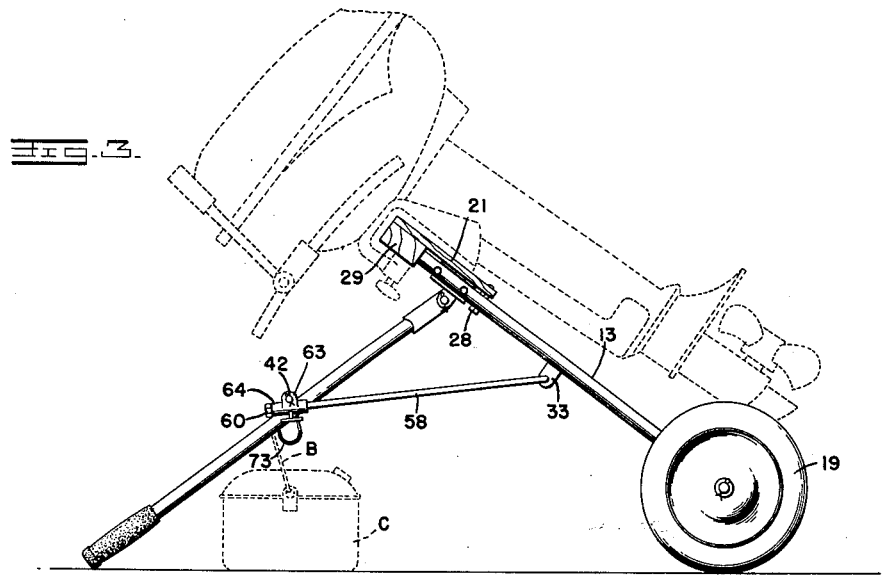
FIG. 3.
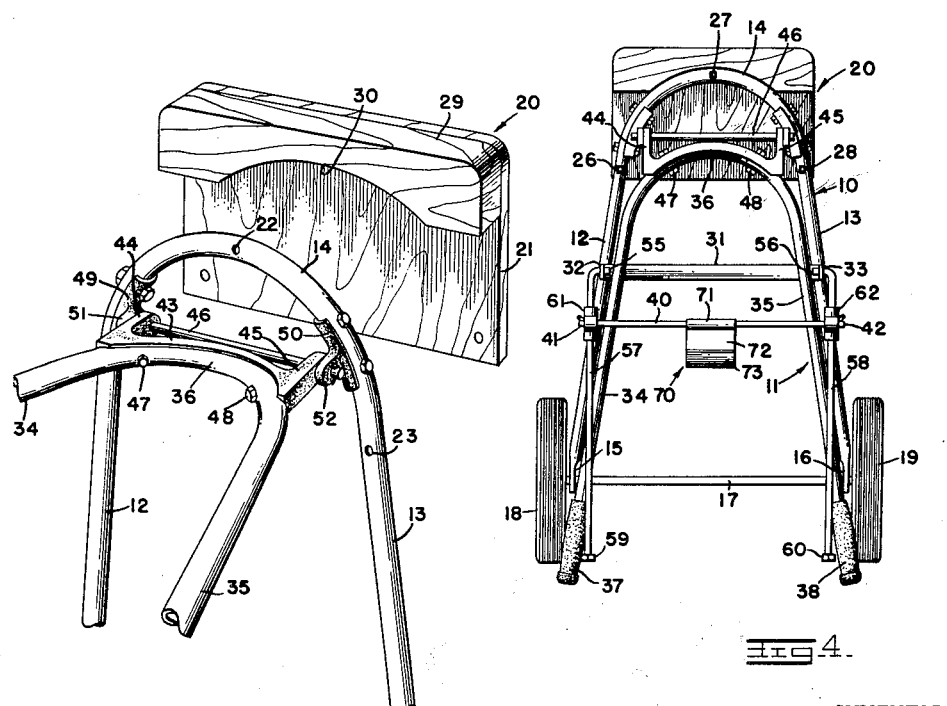
FIG. 4.
FIG. 5.
INVENTORS
John B. Beaman
Vivian L. Ott
BY
Shoemaker & Mattare
ATTORNEYS United States Patent Office 3,071,387
Patented Jan. 1, 1963

3,071,387
OUTBOARD MOTOR CARRIER
John B. Beaman, 815 Church St., Ahoskie, N.C., and Vivian L. Ott, 6100 Sylvan Ave., Norfolk 8, Va.
Filed Sept. 23, 1959, Ser. No. 841,708
4 Claims. (Cl. 280—47.24)

This invention relates to collapsible carts and pertains, more particularly, to a carrier or cart of this nature particularly suited for carrying outboard motors.

Modern outboard motors are frequently rather cumbersome and heavy, particularly with the recent advent of rather large displacement engines which include many beneficial accessories adding to their bulk and weight, such accessories as self-starters, transmission or other change speed mechanisms as well as generators and other accessories as well. Because of this, it is desirable to provide some means for transporting such motors about as, for example, between the storage place and the boat upon which they are mounted or for other reasons where transportation of the motor is necessary. At the same time, the means for carrying the motor should be of such size as to be easily carried about and it is also desirable that it be collapsible for storage inasmuch as space is frequently at a premium. It is, therefore, of primary concern in connection with this invention to provide an improved collapsible carrier for outboard motors which is of light weight construction and yet fully effective for transporting even the heaviest of outboard motors about and which, at the same time, is collapsible so that it may be stored with a minimum of waste space.

A further object of this invention is to provide an improved form of collapsible carrier for outboard motors wherein the assemblage includes a main frame portion upon which the motor is mounted and wherein a handle assemblage is also provided which is collapsible relative to the main frame portion and which further is provided with means for immobilizing the handle assembly with respect to the main frame in various adjusted positions relative thereto to naturally achieve the proper balance of the motor while being transported.

Another object of this invention is to provide an outboard motor carrier having a main frame formed essentially from a single length of tubing and being provided with a wheeled axle assembly including means for clamping an outboard motor thereto and in combination therewith a handle mechanism pivoted to the main frame adjacent the upper end thereof and movable between a collapsed position relative thereto in a position outstanding therefrom so that the main frame may be manipulated by a single operator and pushed or pulled from place to place as desired, there being also means provided for locking the handle assembly to the main frame in various desired adjustable positions.

A further object of this invention is to provide an improved outboard motor carrier which is characterized by its simplicity in construction and effectiveness in operation, in which the carrier includes two main components, the handle assembly and a main frame assembly, each of which is constructed essentially of a single length of tubing bent into generally U-shaped configuration and wherein there is provided a single bracing means in each instance extending between the spaced legs of the U-shaped configurations serving to interconnect and relatively position the same and wherein in each instance the bracing means serves a secondary purpose also which is common to the extent that a locking mechanism extends between the two such braces to fix the relative position of the two main components relative to each other.

At this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

In the drawings:

FIG. 3 is a side elevational view of the assembly showing the same in a position of rest and also serving to illustrate the manner in which a gasoline can can be picked up during transport without requiring the operator to remove his hands from engagement with the hand grip means;

FIG. 4 is a rear elevational view showing the cart or carrier in collapsed position; and FIG. 5 is a perspective view illustrating the upper portion of the carrier and showing the wooden transom piece in exploded relation relative thereto.

Figure 1:
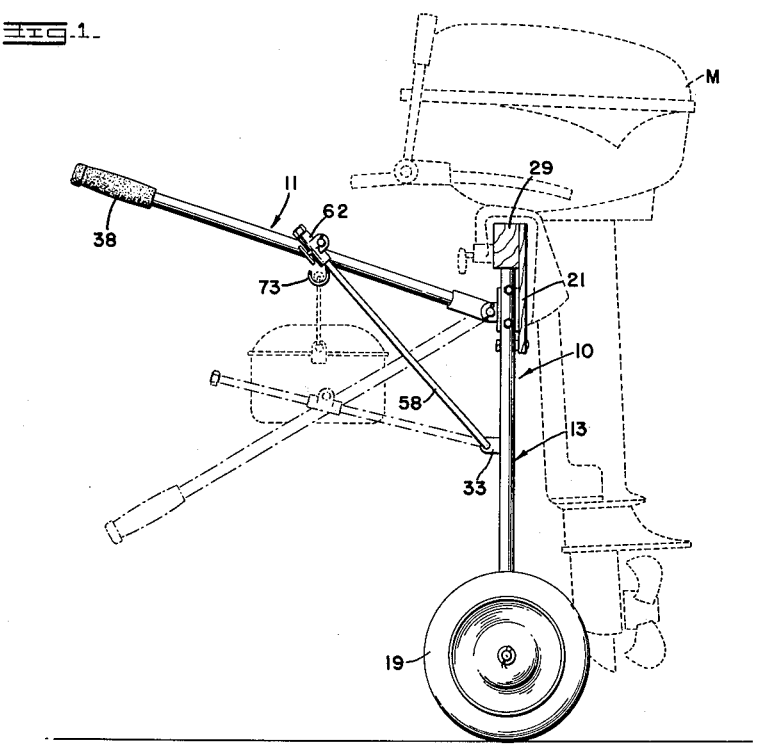
FIG. 1 is a side elevational view of the carrier constructed in accordance with this invention and showing the same in full lines in operative position and showing also an intermediate position of the handle and brace means in dotted line position, an outboard motor and a gasoline can illustrated in dotted lines positioned relatively to the carrier.
Figure 2:
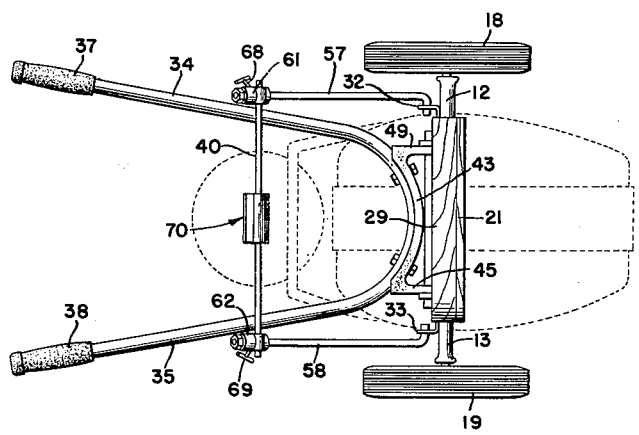
FIG. 2 is a top plan view of the assembly shown in FIG. 1.

Referring now more particularly to the drawings, the carrier illustrated therein consists essentially of two main component parts, the frame assembly indicated generally by the reference character 10 and the handle assembly indicated generally by the reference character 11. As can be seen most clearly in FIG. 4, both the main frame 10 and the handle assembly 11 consist essentially of single lengths of tubing. In the case of the frame 10, this length of tubing is bent into a generally U-shape presenting the spaced legs 12 and 13 which are interconnected by the arcuate bight 14. The legs 12 and 13 are slightly divergent preferably, as shown, and the lower extremities thereof are flattened as indicated by the reference characters 15 and 16 and these flattened portions are provided with openings which are transversely aligned with each other and which receive therethrough the axle member 17, journalling the same therewithin. Fixed to the axle 17 at the opposite ends thereof on the outer sides of the flattened portions 15 and 16 are wheel members 18 and 19 so that the main frame 10 is easily pushed or pulled from place to place while in a generally upstanding attitude.

A transom piece indicated generally by the reference character 20 is fixed to the upper extremity of the frame 10 and serves the purpose of simulating the transom of a boat and to which transom piece the outboard motor is conveniently clamped while it is affixed to and being carried by the cart assembly. As can be seen best in FIG. 5, this transom piece preferably is formed from a board 21 of uniform thickness and being of generally rectangular shape which is provided with three apertures arranged at the apices of a triangle in alignment with the legs 12 and 13 and the midportion of the bight 14, which portions are also provided with openings such as those indicated by the reference characters 22 and 23 in FIG. 5 to receive the through bolts 26, 27 and 28, see particularly FIG. 4, by means of which the board 21 is rigidly affixed to the frame tubing. Overhanging the bight is the transom piece 29 glued or otherwise rigidly affixed to the board 21 and having a cut-away portion 30 conforming generally to the shape of the bight 14 so that the major portion of the bight is nested within the cut-away portion 30 as will be appreciated from FIG. 1, for example. The purpose of the transom piece 29 is to render the transom of sufficient thickness to permit the ready attachment of a motor thereto and is of approximately the same thickness as is conventionally provided for on the transom of a boat.

The two legs 12 and 13 are braced and interconnected by a cross piece 31 which is fixed at its opposite ends to the respective legs and bridges the same to provide a rigid support therebetween. The opposite ends of this brace piece 31 are laterally bent rearwardly to present the ears 32 and 33, the purpose of which will be presently apparent.

The handle assembly 11 is likewise formed essentially of a single length of tubing which is bent in a manner similar to the frame 10 to present arms 34 and 35 which are integrally connected by the bight portion 36 of arcuate configuration as shown. The free ends of the arms 34 and 35 are provided with removable hand grip members 37 and 38 if so desired and by means of which the handle assembly is grasped and manipulated.

The arms 34 and 35 are rigidly interconnected by a brace rod 40 which extends transversely therebetween and is rigidly affixed thereto. The opposite ends 41 and 42 of the brace rod project laterally beyond the respective arms 34 and 35, the purpose of which will be presently apparent.

The bight 36 of the handle member carries a hinge unit 43 which is of generally arcuate configuration, with forwardly projecting hinge ear portions 44 and 45 at its opposite ends which are apertured to receive a hinge pin 46. One side of the hinge unit 43 is of arcuate cross section so as to receive the bight 36 in nested relation therewithin, there being fasteners such as the fasteners 47 and 48 provided for fixing the hinge member rigidly to the bight 36. The bight 14 of the frame carries a pair of transversely aligned bracket members 49 and 50 having the hinge ears 51 and 52 projecting rearwardly therefrom which are also apertured and over-lap the ears 44 and 45 and receive also the hinge pin 46 so as to effect a pivoted connection between the bight portion of the handle assembly and the bight portion of the frame.

The previously mentioned ears 32 and 33 of the cross brace member 31 are apertured and receive the laterally bent ends 55 and 56 of a pair of lock rods 57 and 58. The opposite ends of the lock rods carry the stop members 59 and 60. The brace rod 40 carries on its opposite end portions 41 and 42 respectively the swivel members 61 and 62, each of which includes one portion 63, see particularly FIGS. 1 and 3, having a transverse bore loosely receiving the corresponding end 42 of the cross rod and each also includes a longitudinally extending sleeve 64 having a bore slidably receiving a respective rod 57 or 58. The sleeves 64 permit the rods 57 and 58 to slide relative to the swivel members, whereas the swivel members are free to rotate about the axis of the brace rod 40.

Through the medium of the construction as aforementioned and described, it will be clear, see particularly FIG. 1, that an outboard motor M may be easily positioned on the transom piece of the frame 10 and the handle assembly is grasped so as to push or pull the motor as desired. When it is desired to stop and momentarily park the carrier and motor attached thereto, the carrier can be positioned as shown in FIG. 3. The relative pivoted position of the handle assembly 11 with respect to the frame 10 is controlled through the medium of set screws 68 and 69 threadedly engaged in sleeves of the swivel members 61 and 62 and engageable with the respective rods 57 and 58 to lock the handle relative to the frame at any desired position as may be necessitated so that when the hand grips 37 and 38 are grasped, and with the arms hanging naturally, the frame 10 will be in a generally vertical attitude such as to position the weight of the motor M directly over the axis of the axle 17, whereby the assembly is balanced for ease of transportation. The stop members 59 and 60, of course, prevent the complete disengagement between the rods 57 and 58 and the corresponding swivel members 61 and 62.

Therefore, it will be appreciated that the cross bracing members 31 and 40 serve not only the purpose of interconnecting the legs or arms of the respective frame or handle assemblies, but also serve to carry the means by which the two main components are relatively locked with respect to each other. In addition, the cross bracing rod 40 carries a bail hook indicated generally by the reference character 70. This hook may take the form of a sheet of metal bent into a loop 71 loosely embracing the rod 40 and having a relatively straight depending portion 72 terminating in a hooked edge 73. Since this bail hook hangs freely from the rod 40, and is free to slide back and forth thereupon, a motor can first be positioned on the carrier and if at a subsequent time it is desired to pick up a can C of gasoline having a bail B upstanding, as shown in FIG. 3, the handle is tipped downwardly to engage the hook portion 73 of the bail hook with the bail of the can and thereafter the handle is raised and the operator continues the transporting of the assemblage without having to stop and remove his hands or hand from the carrier.

We claim:

1. A wheeled carrier for an outboard motor, comprising an elongate frame of tubular material and of substantially U-shaped configuration defining an arcuate top end bight portion and a pair of spaced legs connected by and extending in divergent relation from the bight portion, the frame having a forward side and a rearward side, supporting wheels rotatably attached to the lower ends of said legs, means forming a pair of handle bars pivotally attached to the rearward side of the frame at the top thereof and at opposite sides of the bight portion, adjustable locking means pivotally connected between said frame legs and said handle bars and a transom piece fixed to the top of the frame against the forward side thereof to which an outboard motor may be secured, said transom piece comprising a plate of substantial width and height and projecting above the convex top side of said arcuate bight portion, said transom piece including a relatively thick part fixed across the back and top of said plate and bearing upon said top side of the arcuate bight portion.

2. The invention according to claim 1, wherein said relatively thick part is formed with a downwardly directed arcuate recess substantially conforming in curvature to and receiving the convex top side of said bight portion.

3. The invention according to claim 1, with a pair of lock rods each pivotally attached at one end to a leg of the frame, and means on the other end of each rod having sliding and selective locking engagement with a handle bar.

4. The invention according to claim 1, wherein the said means forming a pair of handle bars comprises an elongate frame of substantially U-shaped configuration defining side portions connected by an arcuate bight portion and the pivotal attachment of said means to the frame comprises an arcuate unit fitting over, upon and secured to the convex top side of the latter bight portion and having hinge ears extending longitudinally of said side portions, and hinge ears carried by the first frame and pivotally joined to the ears of said unit.

References Cited in the file of this patent

UNITED STATES PATENTS

| | | |
|---|---|---|
| D. 173,596 | Tunstead | Nov. 30, 1954 |
| D. 183,289 | Ott | July 29, 1958 |
| 1,870,097 | Coller | Aug. 2, 1932 |
| 2,406,183 | Allen | Aug. 20, 1946 |
| 2,415,392 | Morehouse | Feb. 4, 1947 |
| 2,658,703 | Brink et al. | Nov. 10, 1953 |
| 2,663,474 | Kelly | Dec. 22, 1953 |

FOREIGN PATENTS

| | | |
|---|---|---|
| 893,555 | France | Feb. 7, 1944 |